(12) United States Patent
Kick-Rodenbücher et al.

(10) Patent No.: US 10,502,260 B2
(45) Date of Patent: Dec. 10, 2019

(54) METHOD FOR PRODUCING AN INNER RING FOR A TAPERED ROLLER BEARING, AND TAPERED ROLLER BEARING HAVING AN INNER RING

(71) Applicant: Schaeffler Technologies AG & Co. KG, Herzogenaurach (DE)

(72) Inventors: Reinhard Kick-Rodenbücher, Nürnberg (DE); Rainer Eidloth, Herzogenaurach (DE); Markus Mantau, Veitsbronn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/578,749

(22) PCT Filed: Jun. 8, 2016

(86) PCT No.: PCT/DE2016/200267
§ 371 (c)(1),
(2) Date: Dec. 1, 2017

(87) PCT Pub. No.: WO2016/198070
PCT Pub. Date: Dec. 15, 2016

(65) Prior Publication Data
US 2018/0172068 A1    Jun. 21, 2018

(30) Foreign Application Priority Data
Jun. 12, 2015   (DE) .................... 10 2015 210 764

(51) Int. Cl.
*F16C 19/36*    (2006.01)
*F16C 33/64*    (2006.01)
(Continued)

(52) U.S. Cl.
CPC ............ *F16C 19/364* (2013.01); *B21D 53/10* (2013.01); *F16C 19/225* (2013.01); *F16C 33/64* (2013.01); *B21D 53/12* (2013.01); *F16C 43/086* (2013.01)

(58) Field of Classification Search
CPC .. F16C 19/364; F16C 33/4605; F16C 33/583; F16C 33/585; F16C 33/64; F16C 43/086; B21D 53/10
(Continued)

(56) References Cited

U.S. PATENT DOCUMENTS 1,727,576 A * 9/1929 Umstattd .............. F16C 19/364
                                                  384/571
2,880,495 A    4/1959 Strickland
(Continued)

FOREIGN PATENT DOCUMENTS

CN    103328839 A    9/2013
CN    203348310 A    12/2013
(Continued)

OTHER PUBLICATIONS

China Office Action for CN201630033610.9; 7 pgs; dated Jul. 10, 2017 by China Intellectual Property Office.
(Continued)

*Primary Examiner* — James Pilkington
(74) *Attorney, Agent, or Firm* — Kevin L. Parks

(57) ABSTRACT

Tapered roller bearings and methods of producing the same are disclosed. One method is for producing an inner ring for a tapered roller bearing in which the inner ring comprises a raceway portion and a fixed edge portion. The method may include providing an inner ring blank and an unfinished fixed edge portion. The inner ring blank may include an unfinished raceway portion and the unfinished fixed edge portion may have a larger outside diameter than the unfinished raceway portion. The inner ring blank may have a through-opening. The inner ring blank may be formed into the inner ring by extrusion in a main forming step, the unfinished fixed edge portion being transformed into the fixed edge portion and the unfinished raceway portion being transformed into the raceway portion. The inner ring may be formed in its final contour without any cutting.

6 Claims, 3 Drawing Sheets

(51) Int. Cl.
*B21D 53/10* (2006.01)
*F16C 19/22* (2006.01)
*F16C 43/08* (2006.01)
*B21D 53/12* (2006.01)

(58) Field of Classification Search
USPC ................................. 29/898.063, 898.066
See application file for complete search history.

(56) References Cited

U.S. PATENT DOCUMENTS

| | | | |
|---|---|---|---|
| 2,913,811 A | | 11/1959 | Benson |
| 3,496,619 A | * | 2/1970 | Constant ................. B21K 1/04 |
| | | | 29/898.066 |
| 3,737,965 A | * | 6/1973 | Knapp .................... F16C 33/64 |
| | | | 29/898.066 |
| 2014/0068947 A1 | * | 3/2014 | Mantau ................... B21K 1/04 |
| | | | 29/898 |

FOREIGN PATENT DOCUMENTS

| | | |
|---|---|---|
| DE | 102005017588 B3 | 6/2006 |
| DE | 102005028093 B3 | 1/2007 |
| DE | 102011004706 A1 | 8/2012 |
| DE | 102011005326 A1 | 9/2012 |
| GB | 304992 A | 1/1929 |
| JP | 2008296241 A | 12/2008 |

OTHER PUBLICATIONS

K. Lange, A Manufacturing Method of Ball Bearing Inner Ring, Comprising; Blanking Sheet; Flanging to get Preliminary Profile; Extrusion Technology; Sep. 30, 2014.

* cited by examiner

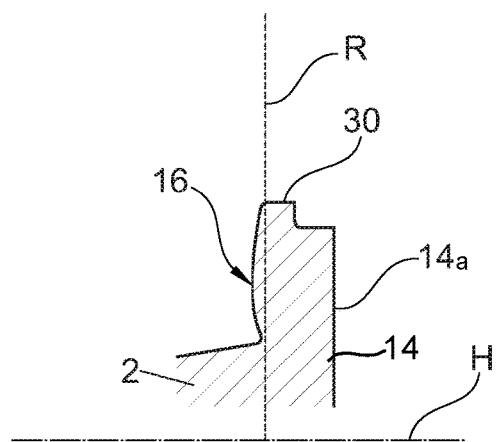
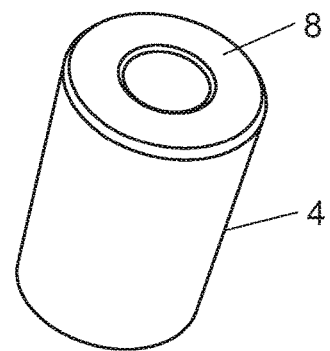
Fig. 3a  Fig. 3b
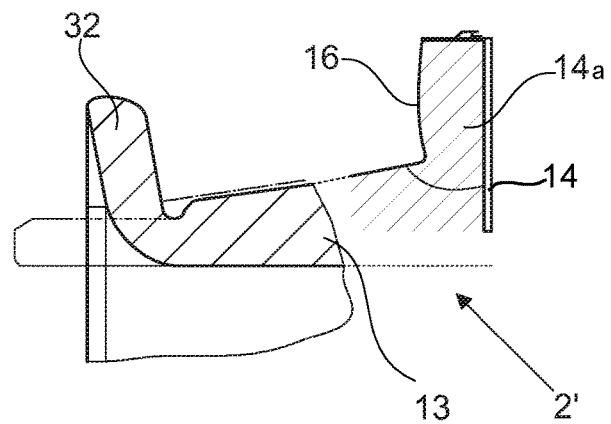
Fig. 3c

METHOD FOR PRODUCING AN INNER RING FOR A TAPERED ROLLER BEARING, AND TAPERED ROLLER BEARING HAVING AN INNER RING

CROSS-REFERENCE TO RELATED APPLICATIONS

This application is the U.S. National Phase of PCT Appln. No. PCT/DE2016/200267 filed Jun. 8, 2016, which claims priority to DE 102015210764.7 filed Jun. 12, 2015, the entire disclosures of which are incorporated by reference herein.

TECHNICAL FIELD

The disclosure relates to a method for producing an inner ring for a tapered roller bearing, in which the inner ring comprises a raceway portion and a fixed edge portion. The disclosure also relates to a tapered roller bearing having an inner ring or having the inner ring of the disclosure.

BACKGROUND

Tapered roller bearings allow both radial loads and axial loads to be deflected via a bearing. Tapered roller bearings usually comprise an inner ring, an outer ring and a plurality of tapered rollers arranged between the inner ring and the outer ring. The tapered rollers are embodied—as the term suggests—in the form of a truncated cone, in which the conical surface forms the bearing surface of the rolling elements.

An edge is usually provided on the inner ring for guiding the tapered rollers. This makes the bearing rings of tapered roller bearings complex components.

The publication DE 10 2011 00 47 06 A1, for example, discloses a corresponding tapered roller bearing in which an inner ring of the tapered roller bearing comprises an edge, which guides the tapered rollers in an axial direction.

The rings for the tapered roller bearings are usually produced, in particular parted or cut, from a solid semi-finished product.

The publication U.S. Pat. No. 2,880,495 A1 discloses a hybrid process for the production of rings for tapered roller bearings, in which a bearing ring body is produced from a flat annulus in a first manufacturing step and the contour and in particular the raceways are formed by removing material in a second manufacturing step.

SUMMARY

An object of the disclosure is to propose a method for producing an inner ring for a tapered roller bearing, which can be performed cost effectively but which at the same time leads to a sufficiently high quality of the inner ring.

This object may be achieved by a method for producing an inner ring for a tapered roller bearing having the features disclosed herein and by a tapered roller bearing having the features disclosed herein. Additional embodiments of the disclosure emerge from the from the following description and from the drawings attached.

The disclosure firstly relates, therefore, to a method for producing an inner ring for a tapered roller bearing. The tapered roller bearing may comprise an inner ring, an outer ring and a plurality of tapered rollers, in which the tapered rollers are arranged so that they roll between the outer ring and the inner ring. The tapered rollers may have a truncated-cone shape. The end faces of the tapered rollers may be either plane or contoured. The conical surface of the truncated cone of the tapered rollers forms the bearing surface of the tapered rollers.

The inner ring comprises a raceway portion which forms a raceway, in particular a contact surface or bearing surface, for the tapered rollers. In particular, the tapered rollers roll on the raceway portion. The raceway portion forms a conically tapering raceway, in particular a contact surface and/or bearing surface, for the tapered rollers. The inner ring further comprises a fixed edge portion having a fixed edge. The fixed edge serves to check and/or support the tapered rollers via their end face.

The method comprises the provision of an inner ring blank, in which the inner ring blank comprises an unfinished raceway portion and an unfinished fixed edge portion. The unfinished fixed edge portion has a larger outside diameter than the unfinished raceway portion. In particular, the unfinished fixed edge portion forms a collar or a flange, which adjoins an end of the unfinished raceway portion. In a longitudinal section along the main axis of rotation of the inner ring blank, the unfinished fixed edge portion is arranged at an angle to the unfinished raceway portion. The unfinished fixed edge portion and the unfinished raceway portion may be integrally formed as a common component.

The inner ring blank has a through-opening. The through opening may have a minimum inside diameter, the minimum inside diameter being equal to at least 50%, such as at least 80% of the minimum inside diameter of the inner ring. In particular, the inner ring blank is of sleeve-shaped formation. The inner ring blank therefore already forms the basic contour of the inner ring to be subsequently produced. It is proposed here that material be already placed where it will be needed for a subsequent shaping step, in order to minimize the material displacement during the subsequent shaping step.

In a further step the inner ring blank is shaped in a main forming step so as to form the inner ring. In this process the unfinished fixed edge portion is transformed into the fixed edge portion and the unfinished raceway portion is transformed into the raceway portion. In particular, in the main forming step the raceway, in particular the contact surface and/or the bearing surface, for the tapered rollers is formed on the raceway portion. In particular, there may be no further shaping of the raceway to be done by way of subsequent machining.

It is proposed that the forming, in particular cold-forming, in the main forming step be done through extrusion. In the extrusion process the temperature in the workpiece, in this case in the inner ring and/or inner ring blank, is lower than the recrystallization temperature of the basic material of the workpiece. In particular, in the extrusion process the inner ring blank is deformed at ambient or room temperature, preferably at a temperature of <50 degrees. During the forming it is possible, however, for higher temperatures to occur due to the deformation work in the inner ring blank or in the inner ring then produced, although even the higher temperatures are lower than the recrystallization temperature of the basic material. The extrusion process advantageously generates surface stresses in the inner ring in the area of the raceway, in particular the contact surface and/or bearing surface, which lead to an increase in performance. It is furthermore advantageous that the extrusion method of manufacture can be performed very cost-effectively in just such large quantities. Overall, the inner ring and hence the tapered roller bearing are cost-effective to manufacture and have good working characteristics.

In the main forming step the inner ring blank is extruded so as to produce the inner ring. The main forming step serves to form, in particular to shape, the contact surface and/or bearing surface of the inner ring. The method according to the disclosure without any cutting allows manufacturing in the final contour or final shape (net-shape manufacturing), especially of the raceway, in particular the contact surface and/or bearing surface. Additional operations, such as cleaning off the scaling which can occur in hot-forming, can furthermore be eliminated.

In one embodiment of the disclosure the method comprises a preliminary forming phase, in which the inner ring blank is produced by forming from an annulus, in particular a plane annulus. The annulus may be parted from a metal strip. The shaping involves folding-over and extrusion of the annulus. An example of how the preliminary forming phase is performed is shown in the publication U.S. Pat. No. 2,880,495 cited in the introduction. The preliminary forming means that a very inexpensive semi-finished product can be used to produce the inner ring, so that the cost-effectiveness of the method is still maintained.

Here a thickness s of the material strip, and hence of the annulus parted from this, is may be of a dimension such that—without the fixed edge—the extruded inner ring has a wall thickness $c1$ at its thickest point of $c1 \leq 0.85$ to $0.95 \cdot s$.

This allows faultless forming of the inner ring by the extrusion method.

In one embodiment of the method the inner ring is formed from the annulus by means of at least two extrusion steps.

In one design development of the disclosure the fixed edge portion comprises a fixed edge having a check surface for the tapered rollers of the tapered roller bearing, in particular for the end faces of the tapered rollers. In the development the check surface is of toroidal shape, the check surface being toroidally shaped in the main forming step. The toroidal check surface is characterized in that this is of annular shape but is convexly curved like a doughnut or torus. The shape may also be described as a life buoy, tire or bulbously curved surface having a hole. Viewed in longitudinal section through the inner ring, the check surface extends in the same direction as a radial plane which is oriented perpendicularly to the main axis of rotation of the inner ring, over an annular area. Inside this annular area the toroidal check surface has a convex elevation. The toroidal check surface serves to reduce the contact surface area between the end face of the tapered rollers and the fixed edge of the fixed edge portion.

The tapered roller bearing may comprise tapered rollers which likewise have a toroidal contact surface for bearing on the toroidal check surface of the fixed edge. This dual measure results in an especially small contact surface area, thereby minimizing the friction in the tapered roller bearing.

In a possible development of the disclosure the inner ring blank comprises an unfinished flanged edge portion and the inner ring comprises a flanged edge portion, the unfinished flanged edge portion being transformed into the flanged edge portion in the main forming step. The flanged edge portion may extend in an axial direction, for example, as a sleeve-like continuation of the raceway portion and may be shaped to form the flanged edge in the main forming step or subsequently in a further forming step. Integrating the flanged edge into the inner ring allows particularly cost-effective manufacturing of the latter, since ultimately only the tool for the main forming step needs to be modified once.

The disclosure further relates to a tapered roller bearing having an inner ring, in which the inner ring comprises a raceway portion and a fixed edge portion; and an outer ring together with a plurality of tapered rollers, in which the tapered rollers are arranged so that they roll between the outer ring and the inner ring. According to the disclosure the inner ring may be produced in its final contour without any cutting by means of extrusion by the method according to the disclosure as has previously been described. The tapered roller bearing having the inner ring therefore again reflects the advantages of the method in the form of a product.

In one embodiment of the disclosure the inner ring comprises a fixed edge portion, as has already been described. The inner ring may likewise comprise the flanged edge portion as has already been described, As already described, the check surface of the fixed edge and/or the end face of the tapered rollers may be of toroidal shape. This measure serves to reduce the friction in the tapered roller bearing.

In a development of the disclosure the outer ring is produced in its final contour without any cutting by means of extrusion, the inner raceway portion forming a raceway, in particular a contact surface and/or bearing surface for the tapered rollers. The outer ring, like the inner ring, is more preferably formed from an annulus, firstly in a preliminary forming phase into an outer ring blank and subsequently in a main forming step into the outer ring.

Here a thickness s of the material strip, and hence of the annulus parted from this, may be of a dimension such that the outer ring extruded therefrom has a wall thickness $c2$ at its thickest point of $$c2 \leq 0.85 \text{ to } 0.95 \cdot s.$$

This allows faultless forming of the outer ring by the extrusion method.

BRIEF DESCRIPTION OF THE DRAWINGS

Further features, advantages and effects of the disclosure emerge from the following description of embodiments of the disclosure, and from the figures attached, of which:

FIGS. 3a, 3b, 3c show various optional details of the inner ring and a toroidal tapered roller.

DETAILED DESCRIPTION

Figure 1:
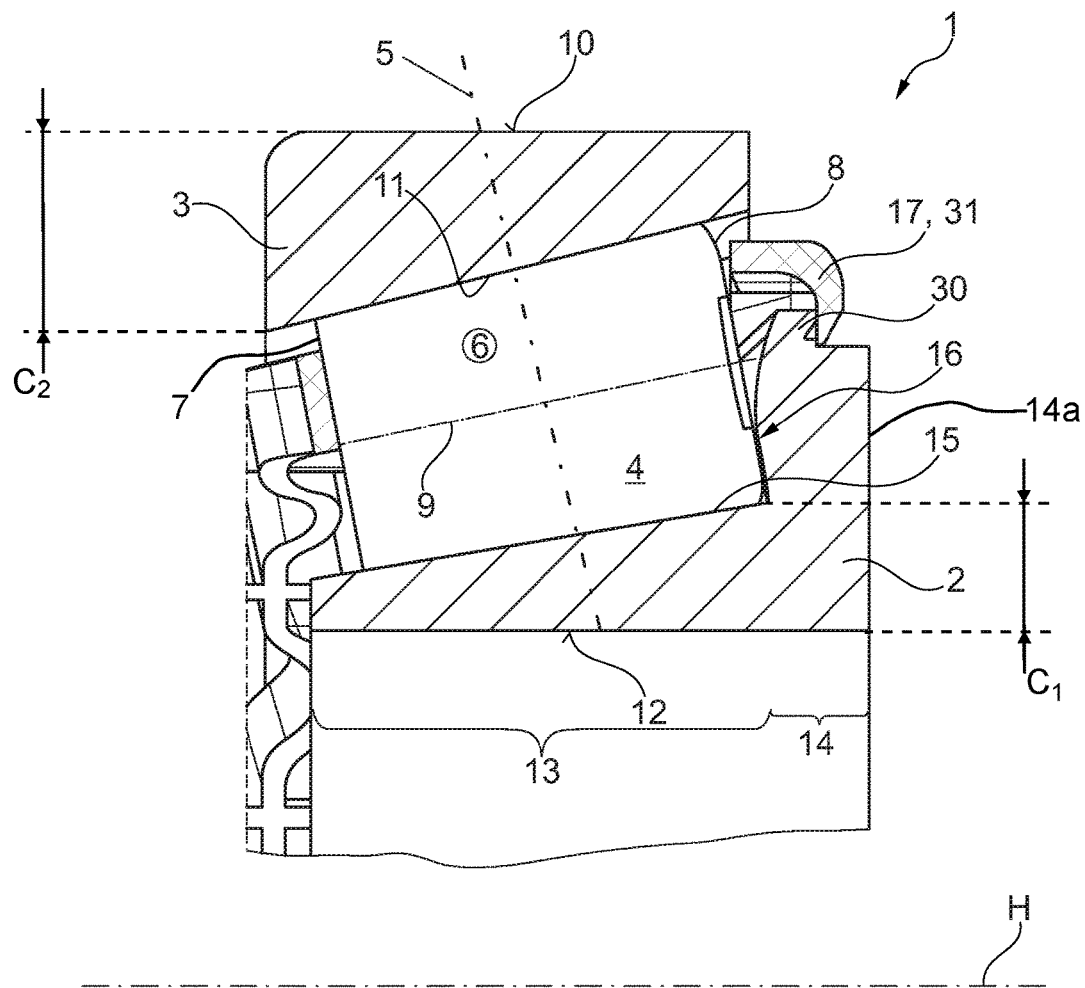
FIG. 1 shows a schematic longitudinal section along a main axis of rotation of a tapered roller bearing as an exemplary embodiment of the disclosure.

FIG. 1 shows a schematic longitudinal half-section of a tapered roller bearing 1 along a main axis of rotation H as an exemplary embodiment of the disclosure. The tapered roller bearing 1 comprises an inner ring 2, an outer ring 3 and multiple tapered rollers 4, which are arranged so that they roll between the inner ring 2 and the outer ring 3. The tapered roller bearing 1 is embodied as a single-row tapered roller bearing. The tapered roller bearing 1 is embodied, in particular, as a radial rolling bearing in which the contact angle 5 is between 0 and 45 degrees.

The tapered rollers 4 have a truncated-cone shape with a conically tapering bearing surface 6. The tapered rollers 4 furthermore each have a small end face 7 and a large end face 8. An axis of rotation 9 of the tapered rollers 4 is arranged inclined in relation to the main axis of rotation H.

The outer ring 3 has a cylindrical outer surface 10 and a conical inner raceway 11 oriented radially inwards for the tapered rollers 4. The outer ring 3 is produced in one piece.

In particular, the outer ring 3 may be made of metal, such as steel. Here the outer ring 3 at its thickest point has a wall thickness c2.

The inner ring 2 has a cylindrical inner surface 12, which defines a through-opening of the inner ring 2. The outer cylindrical surface 10 serves for mounting in a first support structure, such as a socket or a bore, for example; the inner cylindrical surface 12 serves for mounting on a second support structure, such as a spindle or a shaft, for example.

The inner ring 2 may be divided in an axial direction to the main axis of rotation H into a raceway portion 13 and a fixed edge portion 14. The raceway portion 13 forms a raceway 15, in particular a contact surface or bearing surface, on which the tapered rollers 4 roll. The raceway 15 is embodied as an outer raceway of the inner ring 2 and has a conical shape.

The fixed edge portion 14 comprises a fixed edge 14a having a check surface 16 for the large end face 8 of the tapered rollers 4. The check surface 16 extends at an angle, perpendicularly or approximately perpendicularly in the longitudinal section shown, to the contact surface 15. In the longitudinal section shown the inner ring 2 has the shape of a horizontal, large L, in which the horizontal arm is formed by the raceway portion 13 and the arm projecting therefrom is formed by the fixed edge portion 14. The tapered rollers 4 are arranged in a cage 17. Here the inner ring 2 at its thickest point has a wall thickness c1.

The inner ring 2 and optionally also the outer ring 3 may be brought to their final shape without any cutting, by extrusion. In particular, the raceway 15 and the inner raceway 11 are cold-formed by at least one extrusion step.

In the radially outer area of the fixed edge portion 14 a retaining web 30, in which the cage 17 can engage by way of retaining elements 31, is formed on the fixed edge 14a, so that the cage 17 and thereby the tapered rollers 4 are secured by positive interlock to prevent migration away from the check surface 16 and/or the fixed edge portion 14.

Figure 2:
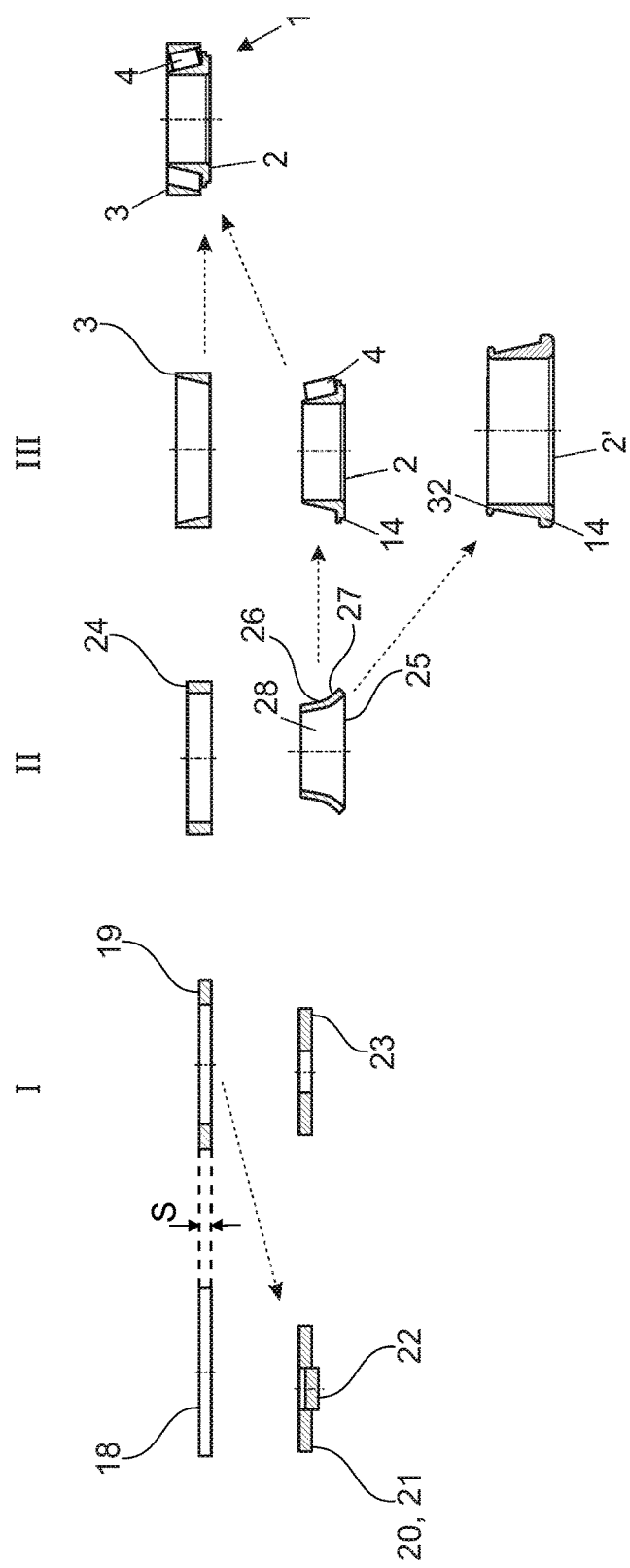
FIG. 2 shows a schematic illustration of the method for producing an inner ring and optionally, in addition, an outer ring for the tapered roller bearing in FIG. 1.

The production of the inner ring 2 and the outer ring 3 is explained in FIG. 2:

From a circular blank 18, which has been parted from a metal strip of thickness s, an annulus 19 is produced as intermediate product for the outer ring 3 by removing a center part 20. The center part 20 forms a further circular blank 21, which is a semi-finished product for the inner ring 2. A further center part 22 is removed from the further circular blank 21, so that in step I an annulus 19 is provided for the outer ring 3 and a further annulus 23 is provided as intermediate product for the inner ring 2. The procedure shown makes particularly economical use of the material of the circular blank 18. Alternatively it is also possible to use another area of the metal strip instead of the center part 20.

In a preliminary forming phase in step II the annulus 19 is formed into an outer ring blank 24, the outer ring blank 24 having the shape of a sleeve. Step II in particular involves folding-over of the annulus 19. In step II the further annulus 23 is formed into an inner ring blank 25, the inner ring blank 25, however, already being formed as a contoured sleeve. Step II in particular involves folding-over and extrusion of the further annulus 23. The preliminary forming step takes the form of an extrusion process in which a temperature of the outer ring blank 24 and of the inner ring blank 25 is always less than the recrystallization temperature of the basic material.

The inner ring blank 25 comprises an unfinished raceway portion 26 and an unfinished fixed edge portion 27. As is apparent from FIG. 2, the outside diameter of the unfinished fixed edge portion 27 is larger than the outside diameter of the unfinished raceway portion 26. As a whole, the inner ring blank 25 takes the form of a sleeve with an outside diameter and inside diameter constantly increasing in an axial direction. The inner ring blank 25 has a through-opening 28, which subsequently in the inner ring 2 forms the through-opening having the cylindrical inner surface 12.

The unfinished raceway portion 26 is formed as a surface of a conically tapering portion both on the inner surface and on the outer surface of the inner ring blank 25.

Step III is a main forming step in which the outer ring blank 24 is formed into the outer ring 3 and the inner ring blank 25 is formed into the inner ring 2 or alternatively into the inner ring 2' (possibly having a flanged edge 32, cf. FIG. 3c), in each case by means of extrusion. Here the flanged edge 32 may be formed before or after uniting the inner ring 2' with the tapered rollers 4. It must be emphasized here that the unfinished raceway portion 26 is transformed into the raceway portion 13 in such a way that the raceway 15 is already formed by the main forming step. In the same way, the inner raceway 11 of the outer ring 3 is already formed by the main forming step or step III.

Although in FIG. 2 the methods for producing the inner ring 2 and the outer ring 3 are represented in parallel, these may also be performed successively, alternately or in any order relative to one another.

A thickness s of the material strip 18 and hence of the annuli 19, 23 parted from this is of a dimension such that at its thickest point (cf. FIG. 1) the inner ring 2 extruded therefrom and also the outer ring 3 each have a wall thickness $c_1$, $c_2$ of ≤0.85 to 0.95·s.

This allows faultless forming of the inner ring 2 and the outer ring 3 by the extrusion method.

FIG. 3a represents the fixed edge portion 14 in the area of the fixed edge 14a of the inner ring 2 as a detailed enlargement. It can be seen that the check surface 16 of the fixed edge 14a is of toroidal design, so that, compared to a radial plane R relative to the main axis of rotation H, a convex annular area is formed, which reaches a maximum in the center part of the annular area.

In the example in FIG. 3a the retaining web 30, in which the cage 17 can engage by way of retaining elements 31 (FIG. 1), is formed on the radially outer area of the fixed edge 14a of the fixed edge portion 14, so that the cage 17 and hence the tapered rollers 4 are secured by positive interlock to prevent migration away from the check surface 16 and/or the fixed edge portion 14.

FIG. 3b shows a three-dimensional view of a tapered roller 4. The large end face 8 of the tapered roller 4 is of toroidal design, so that the contact area between the large end face 8 of the tapered roller 4 and the check surface 16 is minimized, thereby reducing friction.

FIG. 3c, on the other hand, shows a fixed edge portion 14 with a fixed edge 14a of a further inner ring 2', which does not comprise the retaining web 30. Instead, in the case of the further inner ring 2' a flanged edge 32 is provided, which is also produced by the main forming step and/or step III, as an axial extension of the raceway portion 13. In the subsequent production and/or assembly step the extension is bent over as a flanged edge 32.

LIST OF REFERENCE NUMERALS 1 tapered roller bearing
2,2' inner ring
3 outer ring
4 tapered rollers
5 contact angle 6 bearing surface
7 small end face
8 large end face
9 axis of rotation
10 cylindrical outer surface
11 conical inner raceway
12 cylindrical inner surface
13 raceway portion
14 fixed edge portion
14a fixed edge
15 raceway
16 check surface
17 cage
18 circular blank
19 annulus
20 center part
21 circular blank
22 center part
23 annulus
24 outer ring blank
25 inner ring blank
26 unfinished raceway portion
27 unfinished fixed edge portion
28 through-opening
30 retaining web
31 retaining elements
32 flanged edge
H main axis of rotation
R radial plane
C1 wall thickness of the inner ring at thickest point
C2 wall thickness of the outer ring at thickest point
S thick annulus

The invention claimed is:

1. A method for producing an inner ring for a tapered roller bearing in which the inner ring comprises a raceway portion and a fixed edge portion, comprising the following steps:
providing a flat circular blank parted from a metal strip;
removing a center part from the flat circular blank to form an annulus;
forming the annulus into an inner ring blank by extrusion in a preliminary forming step, in which the inner ring blank comprises a continuous conical surface that includes a conical unfinished raceway portion and a conical unfinished fixed edge portion, in which the conical unfinished fixed edge portion has a larger outside diameter than the conical unfinished raceway portion, and in which the inner ring blank has a through-opening; and
forming the inner ring blank into the inner ring by extrusion in a main forming step, the conical unfinished fixed edge portion being formed into the fixed edge portion and the conical unfinished raceway portion being formed into the raceway portion;
wherein a final contour of the inner ring is formed without any cutting.

2. The method as claimed in claim 1, wherein the fixed edge portion comprises a check surface for tapered rollers of the tapered roller bearing, the check surface being formed toroidally in the main forming step.

3. The method as claimed in claim 1, wherein the inner ring blank comprises an unfinished flanged edge portion and the inner ring comprises a flanged edge portion, the unfinished flanged edge portion being transformed into the flanged edge portion in the main forming step.

4. A method for producing an inner ring for a tapered roller bearing, comprising:
providing a flat circular blank;
removing a center part from the flat circular blank to form an annulus;
extruding the annulus into an inner ring blank in a preliminary forming step, the inner ring blank including a continuous conical surface that includes a conical unfinished raceway portion and a conical unfinished fixed edge portion, the conical unfinished fixed edge portion having a larger outside diameter than the conical unfinished raceway portion, and the inner ring blank having a through-opening; and
extruding the inner ring blank into the inner ring in a main forming step, the conical unfinished fixed edge portion being formed into a fixed edge portion and the conical unfinished raceway portion being formed into a raceway portion;
wherein a final contour of the inner ring is extruded without any cutting.

5. The method as claimed in claim 4, wherein the fixed edge portion comprises a fixed edge having a check surface for tapered rollers of the tapered roller bearing, the check surface being formed toroidally in the main forming step.

6. The method as claimed in claim 4, wherein the inner ring blank comprises an unfinished flanged edge portion and the inner ring comprises a flanged edge portion, the unfinished flanged edge portion being transformed into the flanged edge portion in the main forming step.

* * * * *